United States Patent Office 3,215,931
Patented Nov. 2, 1965

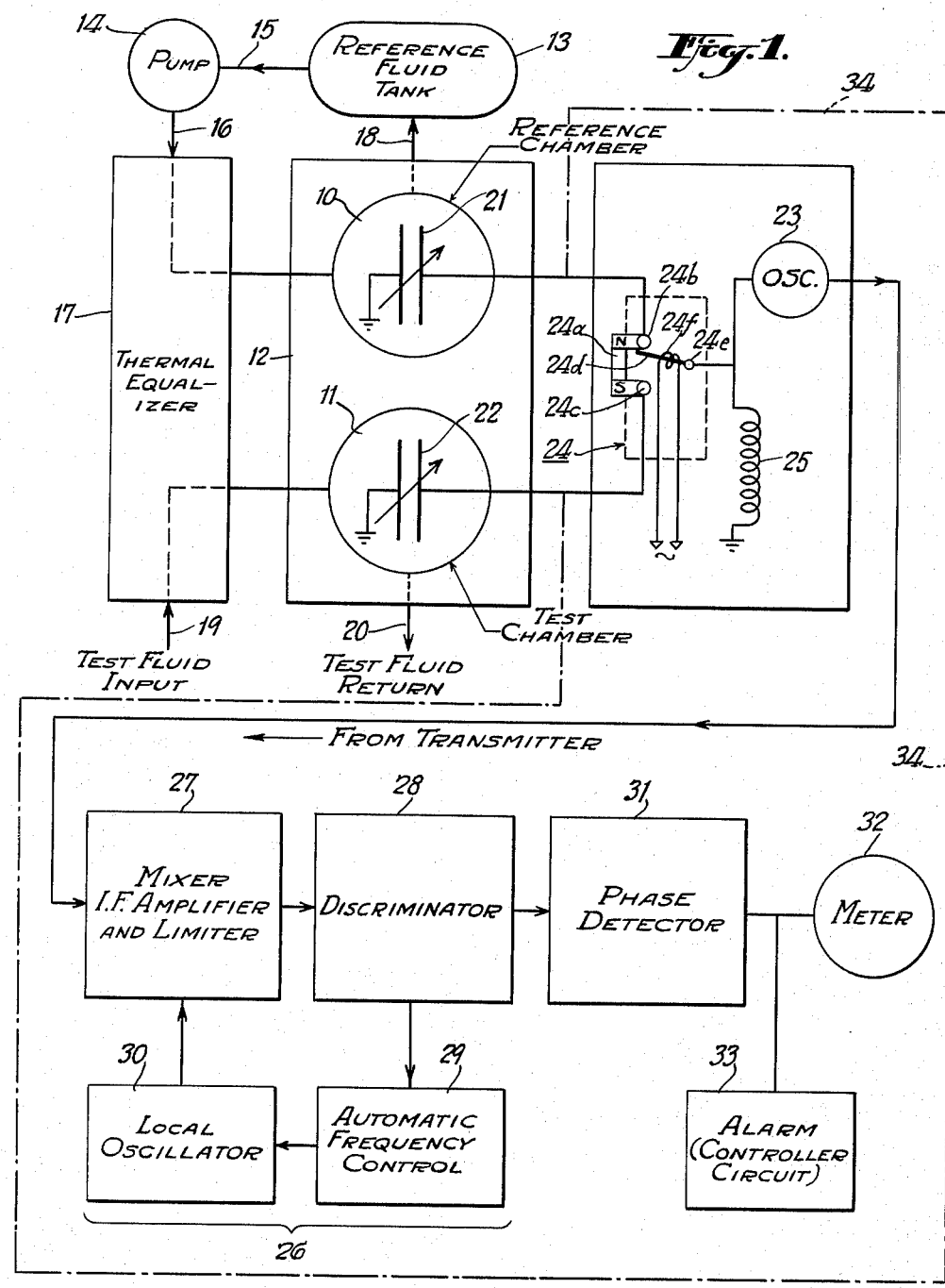

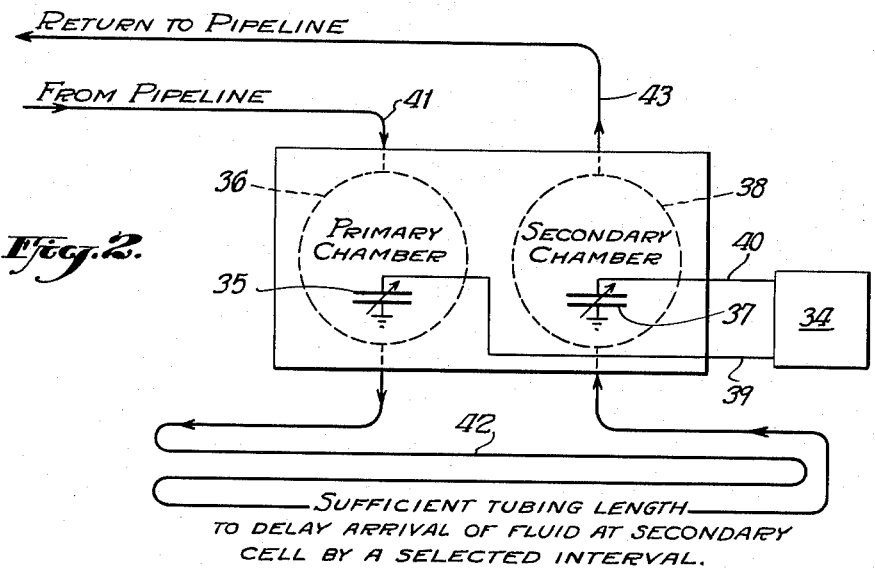
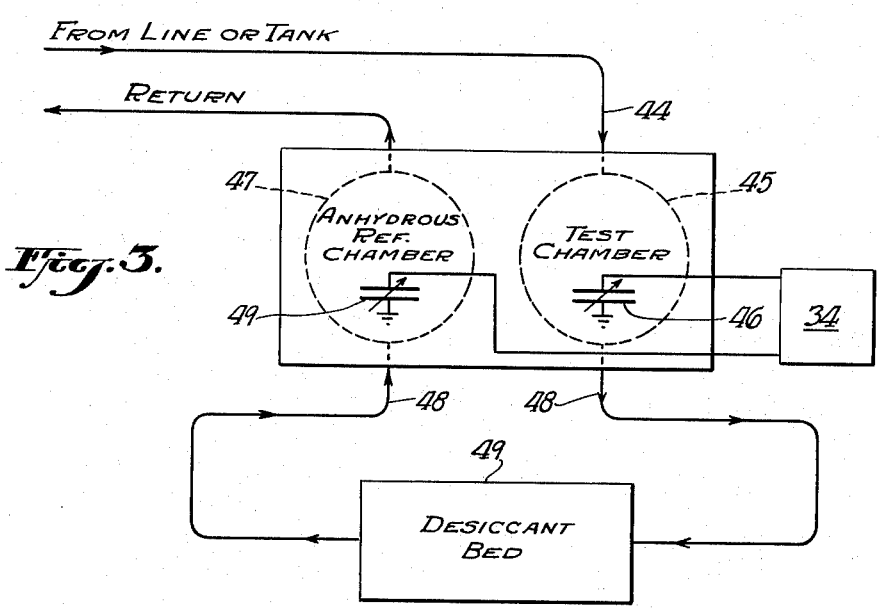

3,215,931
FLUID DIELECTRIC CONSTANT COMPARING DEVICE USING PLURAL FLUID DIELECTRIC CAPACITORS ALTERNATELY CONNECTED TO A SINGLE OSCILLATOR
Robert W. Schooley, Jr., R.D. 2, Lebanon, N.J.
Filed July 21, 1959, Ser. No. 828,627
4 Claims. (Cl. 324—61)

This invention relates to fluid analysis apparatus, and more particularly to an instrument for comparing a fluid undergoing test with a reference fluid by comparing their dielectric constants or dielectric characteristics.

The invention further relates to apparatus for qualitative analysis of fluids, and also to quantitative analysis thereof, for example, in so far as a binary mixture of fluids of known constituents are concerned such as a known grade of gasoline in fuel oil, or moisture in a hydrocarbon.

One of the objects of the present invention is to provide a novel instrument for indicating the presence of very minute amounts of a contaminant in a fluid, for example, for indicating the presence of gasoline in either kerosene or fuel oil, the gasoline comprising the contaminant in this case because in quantities exceeding one-half of 1% lowers the flash point of the kerosene or fuel oil to a dangerous degree.

Another object is to provide novel means which may be employed, for example, in refineries, to distinguish a proper and desired blend of product from one which is sub-graded or degraded by the admixture therewith of as little as one-tenth of 1% of an undesired fraction in the distillation or blending process.

A further object is to provide a novel device which can be used, for example, in traffic control on petroleum pipe lines, and which can determine when an interface is passing and also is capable of determining when the dilution of one product by another immediately preceding it has reached a preselected percentage such as an acceptable low degree of dilution.

Still another object is to provide novel means which may be employed in the control of chemical processes, particularly in controlling precise blending of chemicals.

The invention, in one aspect thereof, comprises a contaminant indicator, and includes in combination two sampling chambers, one for a fluid under test, and one for a reference fluid, the latter ordinarily being homologous with the fluid being tested but being uncontaminated. Means are provided for sensing and comparing the dielectric constants of the two fluids, and for indicating any difference therebetween. Such difference is responsive to the presence of any contaminant having a different dielectric characteristic as compared with the reference fluid.

The above and further objects will more fully appear from the detailed description given below when read in connection with the accompanying drawings, the latter being for purposes of illustration only and not to define the limits of the invention, reference for this latter purpose being had to the appended claims.

In the drawings:

FIG. 1 comprises a schematic diagram of one form of the invention;

FIG. 2 shows a modification of the invention of FIG. 1; and

FIG. 3 shows a second modification of the invention of FIG. 1.

Referring to FIG. 1, the form of the invention shown embodies an apparatus wherein a contaminant is detected by the technique of measuring frequency shift as follows: A pair of sampling chambers 10 and 11 are provided which may be situated within a housing 12 and which are respectively adapted for receiving a reference fluid, as aforementioned uncontaminated and a fluid to be tested. A supply of the reference fluid is contained in a reference fluid tank 13 and the fluid therefrom is directed to the reference chamber 10 by means of a pump 14, the latter being connected to the tank by a conduit 15. The output of the pump 14, via a conduit 16, directs the fluid through a thermal equalizer 17 and thence to the aforementioned reference chamber 10. The latter in turn is connected to the reference fluid tank by a conduit 18, the several elements 10, 13 and 14 thus being in communication for the circulation of the reference fluid as shown.

Although the form of the invention shown embraces the tank 13 for the reference fluid and the pump 14, in certain forms of the invention such elements 13 and 14 may be dispensed with as in the forms to be later described in connection with FIGS. 2 and 3 wherein liquid from a pipe line (FIG. 2) and from, e.g., a gasoline tank (FIG. 3) are tested by apparatus embodying the basic principle of the invention. In the case of the pipe line of FIG. 2, the force for moving the fluid through the test apparatus is attained by the pressure acting on the fluid in the pipe line, such pressure in most cases being attributable to a master pumping station. However, it is not necessary in a basic and broad form of the invention to have any motion of the fluid through the reference and test chambers 10 and 11, it being sufficient that the fluids be static therein, the invention being successfully operable under these conditions.

Further, in other embodiments of the invention the thermal equalizer 17, for making equal, or substantially so, the temperature of the fluids may be dispensed with, examples of such forms of the invention also being shown in such FIGS. 2 and 3.

Test fluid is directed to the test chamber 11 via a conduit 19, for example, from a pipe line or tank containing such fluid to be tested, and the conduit 19 also is directed through the aforementioned thermal equalizer 17 whereby both the fluid undergoing test and the reference fluid are placed at equal temperatures.

The test chamber 11, via a return conduit 20, is in communication with, for example, the source of the test fluid and comprises the test fluid return line.

By means of the aforementioned frequency shift or frequency differential technique, the dielectric characteristics of the reference and test fluids, namely, their dielectric constants, are measured by the apparatus of FIG. 1 as follows:

Identical variable tuning condensers 21 and 22 are placed respectively in the reference and test chambers 10 and 11. The condensers or capacitors 21 and 22 are electrically coupled with the tuning circuit of an oscillator 23 by any suitable means which, in the form shown, comprise a high speed relay or chopper 24, the circuit also including a tank coil or tuning inductance 25 grounded as shown.

The chopper 24 comprises, in one advantageous form, a permanent magnet 24a giving opposed polarity to contacts 24b, 24c. A reed 24d pivoted at 24e acts as a switch arm around which a coil 24f is wound and upon which alternating current is impressed to cause reed vibration between the contacts at the frequency of such alternating currents.

The circuit constants of the oscillator and its electrical elements heretofore described are adjusted so that when the oscillator is tuned by the capacitor 21 in the reference chamber, its output frequency is substantially identical to its frequency when it is electrically coupled to and tuned by the capacitor in the test chamber, provided that the fluids in both the test and the reference chambers are identical or at least have identical dielectric characteristics. This is referred to as the initial adjustment.

The high speed relay 24 is selected to be of low thermal drift in so far as its stray capacitance is concerned.

The degree of similarity of the frequency of the oscillator 23 when tuned by the test capacitor is, for example, within a few parts per million of its frequency when it is tuned by the other capacitor provided, as aforementioned, that the dielectric characteristics of the two fluids are identical.

In lieu of the use of the reference capacitor 21 in such an identical fluid for the purpose of making said initial adjustment of the apparatus by making identical or substantially so the frequencies as aforementioned, it is possible to employ an arbitrarily selected and continuously used reference fluid, for example, fuel oil or kerosene regardless of the nature of the fluid undergoing test. Alternatively, a fixed capacitor (not shown) may be substituted for the variable reference capacitor 21, it being understood that the reference chamber may or may not be dispensed with, that is, such fixed capacitor may or may not be immersed in a fixed or continuously used reference fluid. Such alternative forms of the invention will cause a large differential in oscillator output frequencies when the chopper 24 is in operation. The zero setting of the instrument, that is, the setting up of some suitable norm on a scale may then be re-established by appropriate electrical biasing of the output indicator, for example, the meter 32.

If the test and reference fluids are not identical, one cannot utilize fully the available sensitivity of the present apparatus. However, it is possible to employ a single reference fluid, for example, kerosene aforementioned, when measuring the dielectric constant of other fluids such as fuel oil or gasoline and to obtain satisfactory results depending on the degree of precision demanded. But note that if the fluids are different in the two chambers, for example, kerosene as a reference and fuel oil as a test fluid, one can (in lieu of the aforementioned appropriate electrical biasing of the output indicator) tune both test and reference capacitors to produce substantially equal frequency outputs of the oscillator 23.

In the apparatus so far described the only factor, with the exception noted below, which can cause a drift in the differential frequency is the drift of one of the substitutive elements, in this case the capacitors, with respect to the other. However, since these elements are identical, are identically tuned, and selected for their stability, they do not cause any substantial drift, and in fact such drift, if any, is of negligible proportions.

The exception mentioned in the last paragraph comprises the chopper 24 and its connecting leads which may possibly cause a drift by differential variation in stray capacitances. However, the extent of drift produced in this form of the apparatus will be limited to that last named and is thus reduced to the minimum believed attainable. In any event, such drift is compensatable.

The output of the oscillator 23 comprises the critical information desired and such information comprises electrical oscillatory energy of a frequency which can be transmitted any reasonable distance and further can be attenuated or amplified without losing its identity. In the form shown, the output of the oscillaor 23 is directed into a superheterodyne circuit 26 including a mixer, I.F. amplifier and limiter 27, a discriminator 28, the latter producing a signal which is directed to an automatic frequency control device 29 which in turn directs a signal to a local oscillator 30, the latter in turn directing its signal to the aforementioned element 27.

Such mixer, I.F. amplifier, and limiter 27 perform their conventional functions, for example, the limiter prevents variations in transmission line attenuation, or amplifier gain or oscillator output voltage from influencing to any degree the quantitative calibration of the apparatus. The limiter eliminates drift or noise as in conventional FM practice.

The discriminator detects the difference in frequencies put out by the oscillator 23, that is, it detects the difference in the frequency of the signal when the oscillator is tuned by the capacitor 21 as compared with such frequency when it is tuned by the capacitor 22.

Such frequency differential causes the output of the discriminator 28 to be of a square wave form whose amplitude is proportional to such frequency difference. The frequency of such wave form is identical to the drive frequency of chopper 24, and the phase of such square wave form depends upon the relative dielectric constants of the two samples of the fluids, namely, the reference and the test samples.

The signal of the discriminator 28 is passed on to a phase detector 31 which produces a direct current output signal which is registered and indicated by means of a meter 32 electrically connected thereto. Also, such direct current output signal of the phase detector, as shown, can actuate an alarm device 33 which can embrace a suitable control circuit or means.

Referring now to the modification shown in FIG. 2, the form of the invention is particularly adapted as a cut-point indicator for the determination of an interface in a pipe line. In order to accomplish this result, the apparatus should be constructed and arranged in such a way as to take advantage of the basic features of the apparatus shown in FIG. 1, that is, it is basically a comparison instrument. This is accomplished by suitable means for continuously extracting a sample from the pipe line, passing same through a primary chamber and subsequently through a secondary chamber, there being in each a capacitor analogous to capacitors 21 and 22 of FIG. 1.

Such capacitors, as employed in FIG. 2, are electrically connected to the portion of the apparatus designated 34 in FIG. 1 and schematically indicated in such FIG. 2.

Thus a capacitor 35 is located in a primary chamber 36, and a capacitor 37 is located in a secondary chamber 38. Said capacitors by the leads 39 and 40 are electrically connected to said portion 34 of the apparatus of FIG. 1.

The liquid or fluid, for example, from a pipe line is directed to the primary chamber 36 via a conduit 41 and from the latter chamber to the secondary chamber 38 via a length of tubing 42. The liquid from the secondary chamber 38 is returned via a conduit 43.

The length of the tubing 42 may be sufficiently short so that the liquid comprising the interface material simultaneously passes through both primary and secondary chambers, the chambers not being in parallel. This occurs under the following conditions: An interface, for example, between fuel oil and kerosene may be created at a primary pumping plant or at a tank farm by control of certain valves and such interface is relatively short in length at its point of origin and may be, for example, only a few feet long. However, when such interface has been moved over a substantial distance, for example, several hundred miles, it may lengthen out and become many yards in length, for example, a hundred yards, and it is the determination of such interface which is accomplished by the apparatus of FIG. 2. Normally the determination of an interface is required at some location distant from the point of origin of the interface.

The time interval between the arrival of the sample interface material at the first and second chambers depends upon the length of the tubing 42 inserted between such chambers and also on the rate of flow of the sample through such tubing 42. Normally such time delay will be chosen to be shorter than the time of passage of the interface. However, if it is known that such interface is composed of products of nearly identical dielectric constant, it may be advisable to increase the time delay by a large amount, that is, to increase the length of the tubing 42.

If the length of the interface material in the pipe line is substantial so that its time of passage is greater than the time delay required for material to pass from chamber 36 through tube 42 and into chamber 38, both the primary and secondary chambers simultaneously will contain portions of such interface material. However, such portions will be of differing percentages of constituents, that is, the portion of the interface material passing through the primary chamber 36 may be 20% kerosene and 80% fuel oil whereas the interface material passing through the secondary chamber may be 50% fuel oil and 50% kerosene. The apparatus of FIG. 2, of course, will detect such difference in characteristics by detecting the differences in their dielectric constants.

When the interface has passed completely, the dielectric constants of the fluids in the primary and secondary chambers will become equal (in the absence of a contaminant in one chamber) and thus no difference in frequencies will be registered and it will be known that the interface has passed.

Referring now to FIG. 3, a modification of the apparatus is shown which is identical to that shown in FIG. 2 with the exception that in lieu of the relatively long length of tubing 42 there is substituted a shorter tubing length and a desiccant bed. This is for the purpose of converting the apparatus to a moisture indicator, for example, for determining the extent of moisture in jet fuel.

The rapidly increasing ceilings of jet aircraft has brought about a number of jet engine failures caused by sticking or clogging of the fuel system components which has been attributed to frozen particles of entrained moisture or aggregates of ice particles actually frozen out of solution in the jet fuel. Because of the high stability and accuracy of the apparatus, as shown in FIG. 3, and the wide difference between the dielectric constants of water and hydrocarbon fuels, it is possible to employ the present invention as a comparison instrument for the purpose of sensing the difference between jet fuel containing moisture and jet fuel from which all moisture has been removed.

Consequently, as in FIG. 3, an intake line 44 is employed for directing the jet fuel or other liquid into a test chamber 45 in which is located a capacitor 46 (analogous to capacitors 37 and 21). The liquid thereafter is directed to a secondary chamber 47 comprising a reference chamber via a conduit 48 in which is interposed a desiccant bed 49 for the purpose of removing the moisture aforementioned.

Located in the secondary or reference chamber 47 is a capacitor 49 which is analogous to capacitors 22 and 35 aforementioned.

Thus a sample of such fuel can be extracted from the line or from the tank whose contents are in question, passed through the first cell 45, then through the desiccant bed 49 composed, for example, of silica gel or a molecular sieve. Following dehydration in the desiccant bed, the fuel passes to the anhydrous chamber or secondary chamber 47 and is returned to the line or removed to a suitable sump.

The present apparatus of FIG. 3 will indicate promptly and continuously the presence of any moisture in the fuel by means of the portion 34 of the apparatus described in connection with FIG. 1.

Variations in the type of jet fuel under test from one determination to another will have no effect on the measurement by the apparatus because the same jet fuel is contained in both cells 45 and 47. The only variable is the change in the water content.

Reverting to FIG. 1, in the combined mixer I.F. amplifier and limiter 27, the incoming signal is heterodyned and amplified in one or more stages and thereafter the electrical signal is directed to the discriminator 28 which detects the frequency difference as aforementioned. That is, the discriminator 28 detects frequency difference and such difference appears as a square wave, the amplitude of which is proportional to such frequency difference, the frequency of which is identical to the frequency of the energy actuating the chopper 24, and the phase of which depends upon the relative dielectric constants of the two fluids in the chambers 10 and 11.

The output of the discriminator is thereupon directed to the phase detector 31 which rectifies same and puts out a direct current which is registered on a meter 32 and, if desired, caused to actuate the alarm or control circuit 33.

Regarding the aforementioned square wave and the relationship of its frequency as identical to that of the energy driving the chopper 24, such chopper frequency is the cause of the phase detector frequency.

The discriminator circuit is one which delivers a certain direct current voltage proportional to the radio frequency which is fed into the circuit. This voltage varies about a zero or base line, that is, it varies between positive and negative values above and below such line. For example, at the center frequency or so-called resting frequency of, for example, 5 mc., the discriminator is adjusted to have a zero "out" voltage signal. However, at for example 4.9 mc. such discriminator is adjusted to have, for example, a —2 voltage "out" signal. The discriminator characteristic versus frequency is a linear function, that is, the discriminator curve is a straight line over its operating range.

Assume that the sampling chamber causes the oscillator to be tuned to 5 mc. whereupon we will have a zero voltage output of the discriminator. Further, assume that the other chamber, when the chopper switches to it, causes a frequency of 4.9 mc. so that the discriminator at this instant is delivering the aforementioned —2 volts D.C., this being an instantaneous value for the duration of interval of the 4.9 mc. frequency.

A very short instant later the chopper swings back to the other side and the discriminator delivers zero volts again so that a square wave is produced of voltage whose frequency is equal to chopper frequency, whose amplitude is dependent on discriminator characteristic and which varies from zero to —2 and back to zero.

In the form of the invention shown, we are concerned not with the absolute values of these quantities but with the differences between them. Accordingly, whether the voltage value varies from zero to —2 or—5 to—7 or +17 to+15 as the chopper swings back and forth it makes no difference in the operation of the instrument because the critical value resides in the A.C. amplitude of the pulsating D.C. square wave.

Because of this fact, the entire apparatus is insensitive to variations in performance and calibration which otherwise obviously affect dielectric measurement apparatus.

A further refinement comprises the inclusion of an automatic frequency control, which by adjusting the local oscillator frequency with a signal fed back from the discriminator, causes the I.F. frequency always to be such as to be within the linear operating range of the discriminator. As a result of this automatic frequency control, the apparatus herein described is not only proof against errors caused by normal circuit variation and thermal drift, but will maintain calibration and remain on its proper operating point even though the oscillator frequency is changed by a drastic amount, as when fuel oil samples are substituted for gasoline samples under test, even though the apparatus was originally adjusted to measure difference between gasoline and gasoline.

This fact is particularly important when the device is employed for measuring the passage of an interface in a pipe line. Thus the instrument can be "tuned up" to peak sensitivity to indicate the cut point between gasoline samples whose difference in dielectric constant may be only 30 p.p.m. yet not be thrown out of adjustment by the arrival of fuel oil whose dielectric constant relative to gasoline may be ten thousand times this amount.

Although, in the several embodiments of the invention shown in the drawings the capacitors employed are variable, that is by mechanical adjustment of the relative positions of the plates, the latter being for purposes of preliminary adjustment as described above, it is possible in one non-equivalent form of the invention to employ a fixed capacitor as the reference capacitor and a mechanically variable test capacitor. Alternatively, in a still further and separate non-equivalent embodiment both capacitors are mechanically fixed, their capacity being variable only by variation of the dielectric substance surrounding same.

In the forms of the invention shown in FIGURES 2 and 3 it is preferred that the chambers be near one another and within the same housing as shown in order to facilitate isothermal effects. However they may be remote from one another provided the temperatures thereof and therein remain substantially the same.

The term "parameter" as employed herein refers to an independent variable through functions of which may be expressed other variables, such as resistance, conductance, capacitance, frequency, voltage or current.

Also, in the form of the invention of FIG. 3 it is possible to substitute for the desiccant 49 any substance which is capable of removing from the fluid a selected ingredient. For example, a molecular sieve having an affinity for methane may be substituted for the desiccant 49 to extract such methane from natural gas. The substance extracted may be a contaminant or any substance desired to be removed, not necessarly a contaminant.

What is claimed is:

1. In apparatus of the class described for determining the difference between the dielectric constants of a reference fluid and that of a fluid under test, the combination including a pair of sampling chambers, one of which is adapted for placing therein a reference fluid and the other adapted for placing therein fluid under test, a pair of tuning condensers placed respectively in said reference and test chambers and being adapted to have as their dielectric substances the reference and test fluids respectively, a single oscillator having a tuning circuit including alternately one of the aforementioned tuning condensers, switch means for electrically connecting said oscillator to one or the other of said tuning condensers at a given switching frequency, the circuit constants of said oscillator and condenser circuits being adjusted whereby the output frequency of the oscillator when tuned by the condenser in the test chamber is substantially equal to its frequency when it is tuned by the condenser in the reference chamber when the fluids in said two chambers are identical, a frequency discriminator connected to the output of the single oscillator to produce D.C. output signals having instantaneous values proportional respectively to the oscillator output frequency as determined by the value of the respective tuning condenser then connected to the oscillator whereby a square wave output signal of variable amplitude and phase as determined by the relative values of the tuning condensers is produced by the frequency discriminator, and phase detector means driven at the switching frequency and connected to the output of the frequency discriminator to produce an output signal having an amplitude equal to the difference in output signals produced by said frequency discriminator at said given switching frequency.

2. Apparatus as set forth in claim 1 and further including means for bringing to a common temperature the fluids in both of said chambers.

3. Apparatus as in claim 1 and further including utilization means connected to the output of said phase detector means.

4. Aparatus as in claim 3 wherein said utilization means comprises meter means connected to the output of said phase detector.

References Cited by the Examiner

UNITED STATES PATENTS

| Re. 23,368 | 5/51 | Grob et al. | 324—61 |
| 1,932,337 | 10/33 | Dowling | 324—61 |
| 2,485,579 | 10/49 | Elliott | 324—61 |
| 2,494,934 | 1/50 | Doucette | 324—60 |
| 2,599,583 | 6/52 | Robinson et al. | 324—61 |
| 2,613,249 | 10/52 | Babb | 324—61 |
| 2,747,095 | 5/56 | Boucke | 324—60 |
| 2,774,870 | 12/56 | Rutishauser | 324—61 |
| 2,906,948 | 9/59 | Shawhan | 324—60 |
| 2,906,949 | 9/59 | Shawhan | 324—61 |
| 2,934,700 | 4/60 | Holaday et al. | 324—61 |
| 2,939,077 | 5/60 | Branin | 324—82 X |

WALTER L. CARLSON, *Primary Examiner.*

SAMUEL BERNSTEIN, FREDERICK M. STRADER,
*Examiners.*